(12) United States Patent
Ueda et al.

(10) Patent No.: US 11,325,789 B2
(45) Date of Patent: May 10, 2022

(54) SORTING FACILITY

(71) Applicant: DAIFUKU CO., LTD., Osaka (JP)

(72) Inventors: Yuichi Ueda, Shiga (JP); Osamu Matsui, Shiga (JP); Hiroyuki Koide, Shiga (JP); Atsushi Ishikura, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 0 days.

(21) Appl. No.: 17/143,682

(22) Filed: Jan. 7, 2021

(65) Prior Publication Data

US 2021/0206581 A1 Jul. 8, 2021

(30) Foreign Application Priority Data

Jan. 8, 2020 (JP) .............................. JP2020-001110

(51) Int. Cl.
| | |
|---|---|
| *B65G 43/08* | (2006.01) |
| *B07C 3/08* | (2006.01) |
| *B65G 17/12* | (2006.01) |
| *B65G 47/44* | (2006.01) |

(52) U.S. Cl.
CPC .............. *B65G 43/08* (2013.01); *B07C 3/082* (2013.01); *B65G 17/12* (2013.01); *B65G 47/44* (2013.01); *B65G 2203/0283* (2013.01)

(58) Field of Classification Search
CPC ........ B65G 43/08; B65G 17/12; B65G 47/44; B65G 2203/0283; B07C 3/082
USPC ......................................................... 198/358
See application file for complete search history.

(56) References Cited

U.S. PATENT DOCUMENTS

| | | | |
|---|---|---|---|
| 10,377,576 B2 * | 8/2019 | Zak | ........................ B65G 47/34 |
| 2018/0319603 A1 * | 11/2018 | Zak | ........................ B65G 17/345 |
| 2019/0184430 A1 * | 6/2019 | Fumagalli | .............. B65G 47/96 |

FOREIGN PATENT DOCUMENTS

| | | | | |
|---|---|---|---|---|
| EP | 1352855 A1 * | 10/2003 | ............. | B65G 17/30 |
| EP | 3138792 A1 | 3/2017 | | |
| EP | 3502019 A1 | 6/2019 | | |
| JP | 2018-122988 A | 8/2018 | | |

OTHER PUBLICATIONS

European Search Report dated May 11, 2021 in corresponding European Patent Appl. No. 20217783.8.

* cited by examiner

*Primary Examiner* — Gene O Crawford
*Assistant Examiner* — Lester Rushin, III
(74) *Attorney, Agent, or Firm* — Kusner & Jaffe

(57) ABSTRACT

A sorting facility for sorting articles by a plurality of connected conveyance carriages. The sorting facility includes a supervisory controller managing a position of each of the conveyance carriages, a trigger sensor detecting each of the conveyance carriages, and a belt conveyor provided on each of the conveyance carriages. The supervisory controller identifies each of the conveyance carriages that should deliver the articles to the chute based on the managed position of each of the conveyance carriages. The supervisory controller instructs the belt conveyor provided in each of the conveyance carriages identified to start a delivery operation of each of the articles at timing when each of the conveyance carriages identified is detected by the trigger sensor.

4 Claims, 3 Drawing Sheets

SORTING FACILITY

FIELD OF THE INVENTION

The present invention relates to sorting facility connecting a plurality of conveyance carriages conveying objects to be conveyed along a conveyance path, and sorting the objects to be conveyed by loading the objects to be conveyed onto the conveyance carriages or delivering the objects to be conveyed from the conveyance carriages, in a sorting position formed in a predetermined position of the conveyance path.

BACKGROUND OF THE INVENTION

Conventionally, there has been sorting facility as shown in Japanese Patent Laid-Open No. 2018-122988, as the sorting facility sorting objects to be conveyed by running a plurality of connected conveyance carriages along the conveyance path.

The sorting facility in Japanese Patent Laid-Open No. 2018-122988 sorts articles by running a plurality of conveyance carriages connected endlessly along a loop-shaped conveyance path. The conveyance carriages traveling on the conveyance path receives articles in the belt conveyors from an input conveyor provided on a side of the conveyance path. When the conveyance carriages convey the received articles to a predetermined position, the conveyance carriages deliver the articles to a delivery conveyor provided on a side of the conveyance path.

In the sorting facility in Japanese Patent Laid-Open No. 2018-122988, each of the plurality of conveyance carriages is provided with a communication unit. The conveyance carriage transmits and receives information with a communication unit on a ground side provided on a side of the conveyance path by the communication unit. The conveyance carriage drives the belt conveyor to deliver the article to the delivery conveyor based on information on a sorting position transmitted from the communication unit on the ground side.

In the sorting facility as shown in Japanese Patent Laid-Open No. 2018-122988, a position management section on the ground side manages positions of the conveyance carriages traveling on the conveyance path. A control section on the ground side controls drive or the like of the belt conveyor (sorting section) based on the positions of the conveyance carriages managed by the position management section.

However, in the conventional sorting facility as shown in Japanese Patent Laid-Open No. 2018-122988, the conveyance carriage travels on a curve portion or the like of the conveyance path, and thereby a deviation may occur between the position of the conveyance carriage managed by the position management section on the ground side, and a position of the conveyance carriage actually traveling on the conveyance path. Further, a deviation may also occur similarly as a traveling speed of the conveyance carriage varies during traveling of the conveyance carriage. Accordingly, the control section on the ground side controls the belt conveyor on the conveyance carriage based on positional information managed by the position management section deviating from the position of the conveyance carriage actually traveling on the conveyance path. Therefore, the control section on the ground side cannot drive the belt conveyor (sorting section) provided on the conveyance carriage in a predetermined position of the conveyance path, and there is a problem of being unable to sort objects to be conveyed by the conveyance carriages sufficiently.

SUMMARY OF THE INVENTION

It is an object of the present invention to provide a sorting facility capable of causing a sorting section provided on the conveyance carriage to operate reliably in a predetermined position of a conveyance path.

The problem to be solved by the present invention is described above, and a solution to the problem will be described next.

In other words, sorting facility of the present invention is sorting facility connecting a plurality of conveyance carriages conveying objects to be conveyed along a conveyance path, and sorting the objects to be conveyed by loading the objects to be conveyed to the conveyance carriages or delivering the objects to be conveyed from the conveyance carriages, in a sorting position formed in a predetermined position of the conveyance path, and includes a position management section managing a position of each of the conveyance carriages on the conveyance path, a first carriage detection section provided at a conveyance upstream side of the conveyance path from the sorting position, in a position different from a position where the position management section is provided, a sorting section provided on each of the conveyance carriages and sorting each of the objects to be conveyed that is conveyed by each of the conveyance carriages, and a control section controlling the position management section, the first carriage detection section, and the sorting section, wherein the control section identifies each of the conveyance carriages that should sort each of the objects to be conveyed in the sorting position, based on a position of each of the conveyance carriages managed by the position management section, and instructs the sorting section provided on each of the conveyance carriages identified to sort each of the objects to be conveyed, and instructs the sorting section provided on each of the conveyance carriages identified to start a sorting operation of each of the objects to be conveyed at timing when the first carriage detection section detects each of the conveyance carriages identified.

In the configuration, the sorting section is instructed to sort the object to be conveyed in the sorting section based on the position of the conveyance carriage managed by the position management section. The sorting section is instructed to start the sorting operation of the object to be sorted in the sorting section at the timing when the first carriage detection section detects the conveyance carriage identified by the control section.

Sorting facility of the present invention is the above described sorting facility, and includes a transmission section provided at a conveyance upstream side of the conveyance path from the sorting position to transmit an instruction from the control section to the sorting section, wherein the transmission section transmits an instruction to start the sorting operation of each of the objects to be conveyed to the sorting section provided on each of the conveyance carriages identified by the control section at the timing when the first carriage detection section detects each of the conveyance carriages detected by the control section.

In the configuration, the sorting section receives the instruction to start the sorting operation of the object to be conveyed from the transmission section at the timing when the first carriage detection section detects the conveyance carriage identified by the control section based on the position of the conveyance carriage managed by the position management section.

Sorting facility according to the present invention is the above described sorting facility, wherein the first carriage detection section is provided at a conveyance upstream side from a position where the sorting section delivers each of the objects to be conveyed from each of the conveyance carriages, in the conveyance path.

In the configuration, the sorting section is instructed to start delivery of the object to be conveyed from the conveyance carriage at the timing when the first carriage detection section detects the conveyance carriage identified by the control section based on the position of the conveyance carriage managed by the position management section.

Sorting facility of the present invention is the above described sorting facility, and includes a second carriage detection section provided in a position different from the position where the position management section is provided to detect each of the conveyance carriages on the conveyance path, wherein the control section detects a position of each of the conveyance carriages based on a detection result of the second carriage detection section, identifies each of the conveyance carriages detected by the second carriage detection section from the detected position of each of the conveyance carriages, and the position of each of the conveyance carriages managed by the position management section, and instructs the sorting section provided on each of the conveyance carriages identified to sort each of the objects to be conveyed.

In the configuration, the sorting section is instructed to sort the object to be conveyed based on the position of the conveyance carriage detected by the second carriage detection section.

According to the sorting facility of the present invention, the sorting section is instructed to start the sorting operation of the object to be conveyed at the timing when the first carriage detection section detects the conveyance carriage identified by the control section based on the position of the conveyance carriage managed by the position management section. Accordingly, even when a deviation occurs between the position of the conveyance carriage managed by the position management section, and the position of the conveyance carriage actually traveling on the conveyance path, it is possible to make an instruction to the sorting section at the same timing in the predetermined position. Accordingly, the sorting section can sort the object to be conveyed reliably in the sorting position, regardless of presence or absence of the deviation of the position of the conveyance carriage managed by the position management section.

DETAILED DESCRIPTION OF THE INVENTION

Sorting facility 10 of the present invention will be described. The present invention is not limited to the sorting facility 10 shown as follows.

Figure 1:
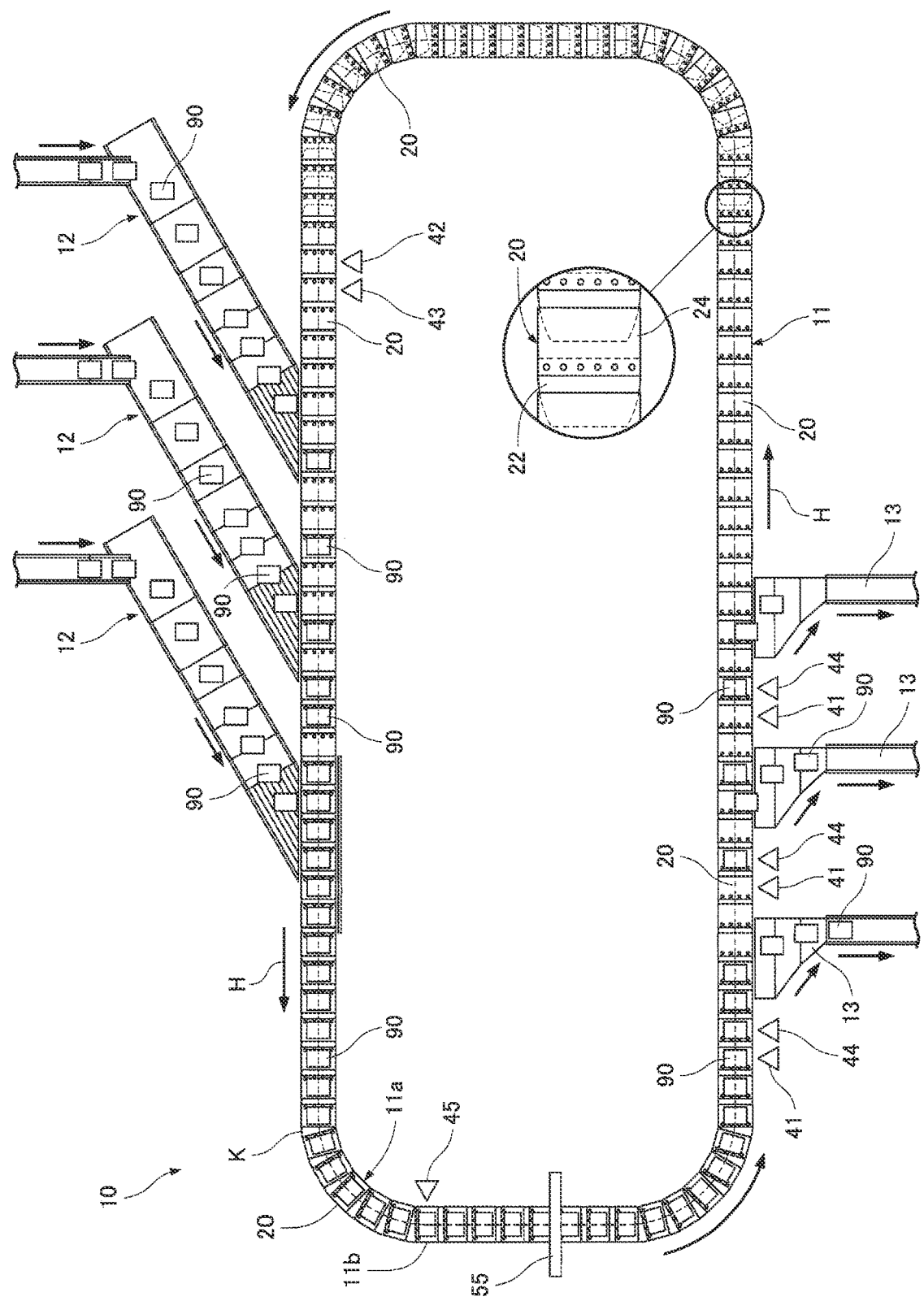
FIG. 1 is a schematic plan view of sorting facility according to the present invention.

As illustrated in FIG. 1, in the sorting facility 10, a loop-shaped conveyance path K for conveying articles 90 (example of "objects to be conveyed") is formed. The sorting facility 10 is mainly composed of a main conveyor device 11 conveying the articles 90 along the conveyance path K, a plurality of induction conveyors 12 inputting the articles 90 onto the conveyance path K of the main conveyor device 11, a plurality of chutes 13 receiving the articles 90 delivered from the conveyance path K of the main conveyor device 11, and an article detection device 55 detecting a placement location of the article 90 on a belt conveyor 23.

Figure 2:
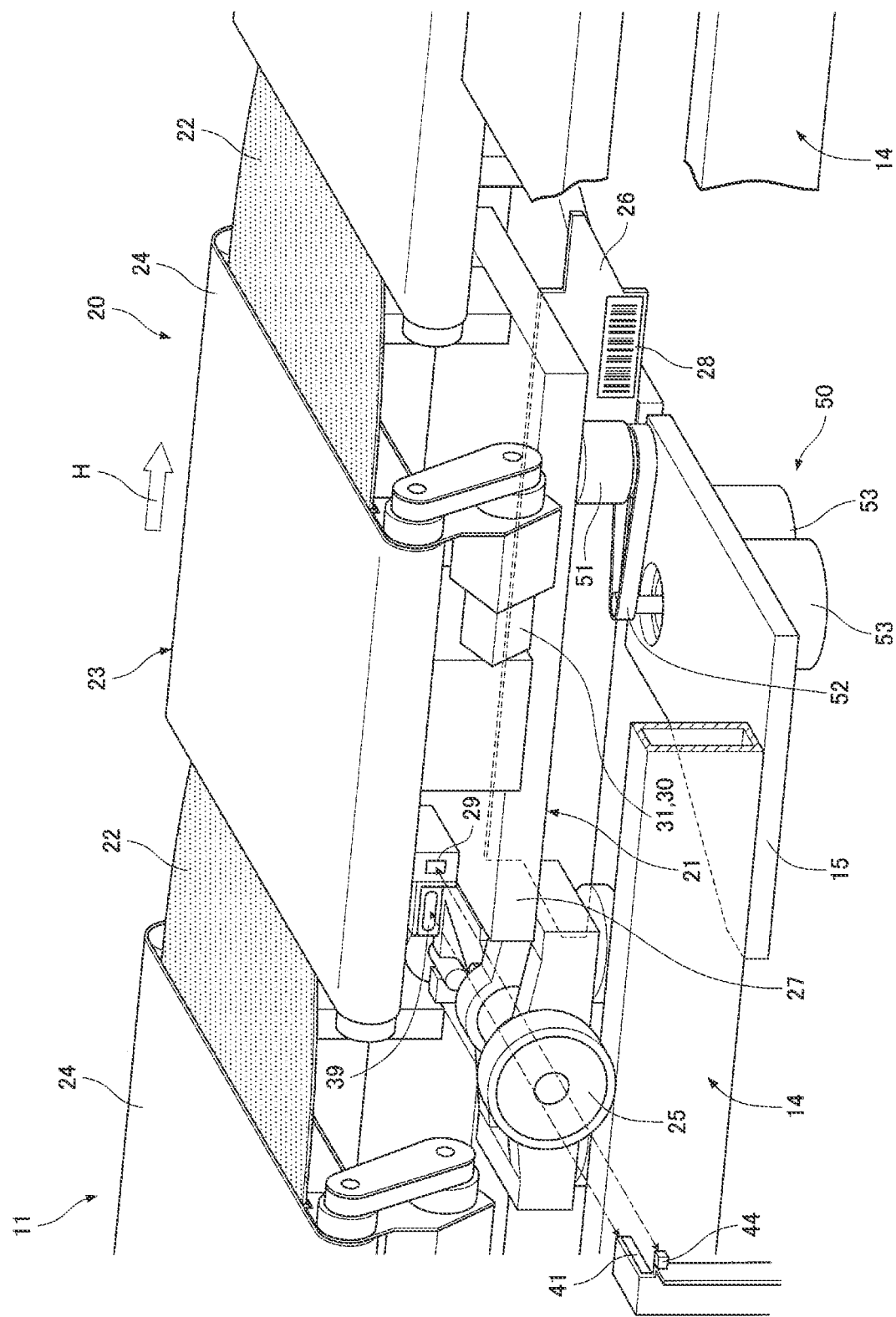
FIG. 2 is a perspective view of a conveyance carriage traveling in the sorting facility according to the present invention.

As illustrated in FIGS. 1 and 2, in the sorting facility 10, the article 90 is inputted to the conveyance carriage 20 traveling along rails 14 of the main conveyor device 11 from a predetermined induction conveyor 12. The article 90 inputted to the conveyance carriage 20 is conveyed along the conveyance path K. The article 90 conveyed by the conveyance carriage 20 is delivered to the chute 13 assigned to each store, and is sorted by store, for example. The article 90 conveyed by the conveyance carriage 20 is adjusted so that a placement location on the belt conveyor 23 is in a center position of the belt conveyor 23 based on detection by the article detection device 55, before delivered to the chute 13.

Figure 3:
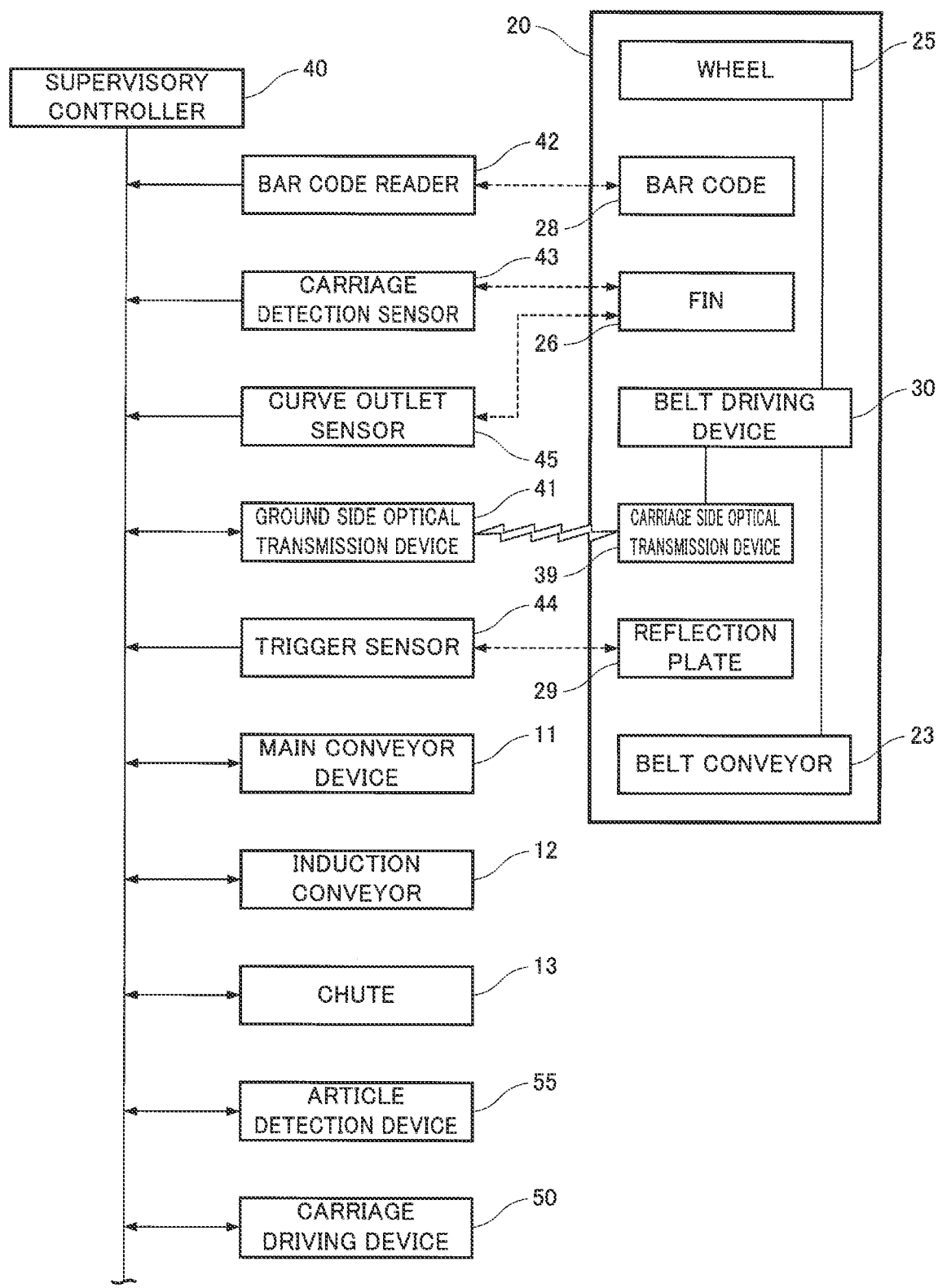
FIG. 3 is a block diagram illustrating a control configuration of the sorting facility according to the present invention.

As illustrated in FIG. 3, the respective devices (the main conveyor device 11, the induction conveyors 12, the chutes 13, the article detection device 55) of the sorting facility 10 are connected to a supervisory controller 40 (example of "a control section" and "a position management section") controlling the entire sorting facility 10, and are controlled by the supervisory controller 40.

As illustrated in FIGS. 1 and 2, in the main conveyor device 11, the conveyance carriage 20 with the article 90 placed thereon travels on the rails 14, and thereby the article 90 is conveyed along the conveyance path K.

The induction conveyor 12 inputs the article 90 to the belt conveyor 23 of the conveyance carriage 20 traveling on the conveyance path K. The plurality of (three in FIG. 1) induction conveyors 12 are disposed side by side along the conveyance path K. In the induction conveyors 12, the conveyance carriage 20 where the article 90 should be inputted is searched for and determined in advance for each of the induction conveyors 12. The induction conveyor 12 inputs the article 90 to the predetermined conveyance carriage 20 determined for each of the induction conveyors 12.

The chute 13 receives the article 90 delivered from the conveyance carriage 20, and conveys the received article 90 to different downstream equipment (for example, shipment equipment), or directly to a vehicle (for example, a truck) or the like. The plurality of (three in FIG. 1) chutes 13 are disposed side by side along the conveyance path K. The chute 13 receives the article 90 determined in advance for each of the respective chutes 13 from the conveyance carriage 20. A position where the chutes 13 are provided in the conveyance path K is a sorting position for sorting the article 90 conveyed by the conveyance carriage 20.

As illustrated in FIGS. 1 to 3, the article detection device 55 is composed of a plurality of sensors provided above the main conveyor device 11, at a conveyance downstream side of the induction conveyors 12, and at a conveyance upstream side of the chutes 13. The article detection device 55 detects the placement location of the article 90 placed on the belt conveyor 23, and transmits a detection result to the supervisory controller 40. The supervisory controller 40 calculates a deviation of the article 90 placed on the belt conveyor 23 from the center position of the belt conveyor 23, based on the detection result from the article detection device 55. The supervisory controller 40 controls the belt conveyor 23 so that the belt conveyor 23 moves the article 90 to the center position of the belt conveyor 23 based on the calculated deviation amount.

Next, the conveyance carriage 20 traveling on the conveyance path K will be described.

As illustrated in FIGS. 1 and 2, the conveyance carriage 20 receives the article 90 inputted from the predetermined induction conveyor 12. The conveyance carriage 20 conveys the received article 90 along the conveyance path K and delivers the article 90 to the predetermined chute 13. The conveyance carriage 20 is connected to the conveyance carriages 20 adjacent to one another in the conveyance path K, and travels on the rails 14 in a state connected to the adjacent conveyance carriages 20. In other words, a plurality of conveyance carriages 20 are connected and arranged annularly along the conveyance path K.

The conveyance carriage 20 travels by drive of a carriage driving device 50. The carriage driving device 50 is a friction drive type driving device. The carriage driving device 50 includes pinch rollers 51 contacting both side surfaces of a fin 26 of the conveyance carriage 20, timing belts 52 rotating the pinch rollers 51, and driving motors 53 driving the pinch rollers 51. The carriage driving device 50 is a driving device transmitting motive power to the conveyance carriage 20 by using a frictional force by contact of the pair of pinch rollers 51. The carriage driving device 50 causes the rotating pair of pinch rollers 51 to contact both the side surfaces of the fin 26 of the conveyance carriage 20. The carriage driving device 50 runs the conveyance carriage 20 by thrusting the fin 26 forward by the frictional force by contact of the pair of pinch rollers 51. A plurality of carriage driving devices 50 are provided in predetermined positions of the conveyance path K, and are provided between a pair of rails 14. The carriage driving device 50 is supported by a support frame 15 fixed to the rails 14. As illustrated in FIG. 3, the carriage driving device 50 is connected to the supervisory controller 40, and is controlled by the supervisory controller 40.

As illustrated in FIGS. 1 and 2, the conveyance carriage 20 mainly includes a body 21 traveling on the rails 14, a cover 22 covering a gap from the adjacent conveyance carriage 20, the belt conveyor 23 (example of "a sorting section") where the article 90 is placed and supported, and a belt driving device 30 for driving the belt conveyor 23.

The body 21 mainly includes wheels 25 for traveling on the rails 14, the fin 26 contacting the pinch rollers 51 of the carriage driving device 50, and a frame 27 supporting respective components of the conveyance carriage 20.

The fin 26 is a long plate member extended along a longitudinal direction (a traveling direction H of the conveyance carriage 20) of the conveyance carriage 20. The fin 26 is attached to a lower part of the body 21. A bar code 28 to identify the conveyance carriage 20 is pasted onto the fin 26. The bar code 28 is pasted on each of the fins 26 of the plurality of connected conveyance carriages 20, and more specifically, pasted on a front lower end edge (front side lower end edge to the traveling direction H of the conveyance carriage 20) of the fin 26. A pasting position of the bar code 28 is not limited to the front lower end edge of the fine 26, and the bar code 28 may be attached to a rear lower end edge (rear side lower end edge to the traveling direction H of the conveyance carriage 20) of the fin 26, for example, if only the pasting position is a position readable by a bar code reader 42 described later. Information peculiar to each of the conveyance carriages 20 such as a carriage number of the conveyance carriage 20 is attached to the bar code 28.

The cover 22 is composed of a plate-shaped member closing the gap between the conveyance carriages 20 adjacent to each other in the conveyance path K. The cover 22 is fixed to a rear side end portion of the conveyance carriage 20 (end portion at a rear side to the traveling direction H of the conveyance carriage 20).

The belt conveyor 23 is provided at an upper part of the body 21. The belt conveyor 23 conveys the article 90 placed on a belt 24 in a direction horizontally orthogonal to the traveling direction H of the conveyance carriage 20, by the belt 24 being driven by a motor 31 of the belt driving device 30. The belt conveyor 23 has the belt 24 driven by the motor 31 of the belt driving device 30 when the conveyance carriage 20 reaches the predetermined induction conveyor 12, and thereby moves the article 90 inputted from the induction conveyor 12 to an appropriate placement location on the belt 24. The belt conveyor has the belt 24 driven by the motor 31 of the belt driving device when the conveyance carriage 20 reaches the predetermined chute 13, and thereby discharges the article 90 placed on the belt 24 in a direction where the chute 13 is located. The belt conveyor 23 sorts the article 90 inputted from the predetermined induction conveyor 12 to the predetermined chute 13 by receiving the article 90 inputted from the induction conveyor 12, and discharging the received article 90 at the chute 13 in this way. When the article 90 on the belt 24 deviates from the appropriate position during conveyance of the article 90 by the conveyance carriage 20, the belt 24 is driven by the belt driving device 30, and thereby the placement location of the article 90 is adjusted to the appropriate position, in the belt conveyor 23.

As illustrated in FIGS. 2 and 3, in the belt driving device 30, electric power for driving the belt conveyor 23 is generated by rotation of the wheels 25, and the belt driving device 30 drives the belt conveyor 23 by the generated electric power. The belt driving device 30 receives an instruction signal from the supervisory controller 40 transmitted via a ground side optical transmission device 41 (example of "a transmission section") provided on a ground side (independently of the conveyance carriage 20) via a carriage side optical transmission device 39. The belt driving device 30 drives the belt conveyor 23 and generates the electric power for driving based on the received instruction signal.

The carriage side optical transmission device 39 is fixed to the frame 27 of the body 21. The carriage side optical transmission device 39 receives a signal from the ground side optical transmission device 41 provided on a ground side by optical transmission. The carriage side optical transmission device 39 is connected to the belt driving device 30 and transmits the signal from the ground side optical transmission device 41 to the belt driving device 30.

As illustrated in FIG. 2, a reflection plate 29 is fixed to the frame 27 of the body 21. The reflection plate 29 reflects a light beam emitted from a trigger sensor 44 (example of "a first carriage detection section") described later.

Next, a control configuration of the conveyance carriage 20 will be described.

As illustrated in FIGS. 1 and 3, traveling of the conveyance carriage 20, an operation of the belt conveyor 23 (belt driving device 30) and the like are controlled by the supervisory controller 40 provided on the ground side (independently of the conveyance carriage 20) and controlling the entire sorting facility 10. The conveyance carriage 20 is not limited to being directly controlled by the supervisory controller 40 controlling the entire sorting facility 10, and may be controlled by a lower-order controller (for example, a controller provided in the main conveyor device 11) than the supervisory controller 40.

In the conveyance carriage 20, a position in the conveyance path K during traveling is managed by information of the bar code 28 pasted on the fin 26 of the conveyance carriage 20, and detection of the fin 26 of the conveyance carriage 20 by a carriage detection sensor 43 described later. Specifically, the position of the conveyance carriage 20 on the conveyance path K is managed based on a result of the bar code reader 42 described later reading the bar code 28, and a result of the carriage detection sensor 43 detecting the fin 26 of the conveyance carriage 20. In other words, in the sorting facility 10, the bar code reader 42, the carriage detection sensor 43, and the supervisory controller 40 function as a position management section managing the position of the conveyance carriage 20 on the conveyance path K.

The bar code reader 42 and the carriage detection sensor 43 are provided on the ground side (independently of the conveyance carriage 20). Specifically, the bar code reader 42 and the carriage detection sensor 43 are provided at a conveyance upstream side from a position of the induction conveyor 12 disposed at a most upstream side of the conveyance path K out of the three induction conveyors 12. In other words, in the sorting facility 10, the position of the conveyance carriage 20 is managed in reference to the conveyance carriage 20 in a position at a conveyance upstream side from a position where the article 90 is inputted to the conveyance carriage 20.

The bar code reader 42 reads the bar code 28 pasted on the fin 26 of the conveyance carriage 20 traveling on the conveyance path K. The bar code reader 42 is connected to the supervisory controller 40, and transmits the read information of the bar code 28 to the supervisory controller 40. The supervisory controller 40 detects the carriage number of the conveyance carriage 20 based on the information of the bar code 28 read by the bar code reader 42. In other words, the supervisory controller 40 discriminates the individual conveyance carriages 20 traveling on the conveyance path K from the information of the bar code 28.

The carriage detection sensor 43 detects the fin 26 of the conveyance carriage 20 traveling on the conveyance path K. The carriage detection sensor 43 is composed of a pair of line sensors (multi-optical axis sensors), for example, and is disposed in a position where a lower edge end portion of the fin 26 is detectable, along the traveling direction H of the conveyance carriage 20. The carriage detection sensor 43 is connected to the supervisory controller 40, and transmits a signal of detection of the fin 26 to the supervisory controller 40. The supervisory controller 40 calculates a traveling speed of the conveyance carriage 20 based on the detection signal transmitted by the carriage detection sensor 43.

The supervisory controller 40 assumes at which position on the traveling route K the conveyance carriage 20 is traveling as a virtual position, based on the carriage number of the conveyance carriage 20 detected from the bar code 28 read by the bar code reader 42, and the traveling speed of the conveyance carriage 20 calculated based on the detection signal from the carriage detection sensor 43. The supervisory controller 40 manages the assumed virtual position as the position of the conveyance carriage 20 on the conveyance path K.

The conveyance carriage 20 starts driving of the belt conveyor 23 based on an instruction signal transmitted from the ground side optical transmission device 41.

The ground side optical transmission device 41 transmits the instruction signal to start an operation of the belt conveyor 23 to the belt driving device 30, to the carriage side optical transmission device 39. The ground side optical transmission device 41 is connected to the supervisory controller 40, and transmits the instruction signal from the supervisory controller 40 to the carriage side optical transmission device 39 provided in the traveling conveyance carriage 20.

The ground side optical transmission device 41 is provided correspondingly to each of the three chutes 13. The ground side optical transmission device 41 is provided in a position at a conveyance upstream side from a position where each of the chutes 13 is disposed, along the conveyance path K. In other words, one ground side optical transmission device 41 is provided for each chute 13 at a position at the conveyance upstream side of the corresponding chute 13.

The ground side optical transmission device 41 transmits the instruction signal to the carriage side optical transmission device 39 based on whether or not the trigger sensor 44 detects the conveyance carriage 20.

The trigger sensor 44 detects the reflection plate 29 provided at the conveyance carriage 20 traveling on the conveyance path K. The trigger sensor 44 is composed of a light emitting section emitting light to the reflection plate 29 provided at the conveyance carriage 20, and a light receiving section receiving light reflected from the reflection plate 29. The trigger sensor 44 is provided correspondingly to each of the three ground side optical transmission devices 41. The trigger sensor 44 is provided in a position at a conveyance downstream side from the position where each of the ground side optical transmission devices 41 is disposed, along the conveyance path K. In other words, one trigger sensor 44 is provided for each ground side optical transmission device 41 in a position at a conveyance downstream side of the corresponding ground side optical transmission device 41. The trigger sensor 44 is provided correspondingly to each of the three chutes 13. The trigger sensor 44 is provided in a position at the conveyance upstream side from the position where each of the chutes 13 is disposed. In other words, the trigger sensor 44 is provided in a position at a conveyance upstream side from a position where the conveyance carriage 20 delivers the article 90. The trigger sensor 44 is connected to the supervisory controller 40, and transmits the signal of detection of the fin 26 to the supervisory controller 40.

An actual position of the conveyance carriage 20 on the conveyance path K is detected by a curve outlet sensor (example of "a second carriage detection section") provided at an outlet portion 11b of a curve portion 11a (curve portion on the conveyance path K) of the main conveyor device 11.

The curve outlet sensor 45 is composed of a single-optical axis sensor, for example, and detects the fin 26 of the conveyance carriage 20 passing through the outlet portion 11b of the curve portion 11a. As illustrated in FIG. 3, the curve outlet sensor 45 is connected to the supervisory controller 40, and transmits the signal of detection of the fin 26 (detection result) to the supervisory controller 40. The supervisory controller 40 detects the actual position of the conveyance carriage 20 on the conveyance path K, based on the detection signal transmitted by the curve outlet sensor 45.

Next, correction of the position of the conveyance carriage 20 managed by the supervisory controller 40 will be described. The position of the conveyance carriage 20 managed by the supervisory controller 40 is corrected according to the position of the conveyance carriage 20 actually traveling on the conveyance path K. As described above, the position of the conveyance carriage 20 managed by the supervisory controller 40 is assumed based on the traveling speed of the conveyance carriage 20 detected by the carriage detection sensor 43 and the carriage number read from the bar code 28. In other words, the position of the conveyance carriage 20 managed by the supervisory controller 40 is assumed in reference to the conveyance carriage 20 detected by the carriage detection sensor 43. However, a deviation may occur between the position of the conveyance carriage 20 assumed by the supervisory controller 40, and the position of the conveyance carriage 20 actually traveling on the conveyance path K, as a result that the conveyance carriage 20 traveling on the curve portion or the like. Consequently, the supervisory controller 40 corrects the deviation of the position by newly assuming the position of the conveyance carriage 20 in reference to the conveyance carriage 20 detected by the curve outlet sensor 45, and updating the position of the conveyance carriage 20 managed by the generally controller so far (position of the conveyance carriage 20 assumed in reference to the conveyance carriage 20 detected by the carriage detection sensor 43) to a new position of the conveyance carriage 20 assumed in reference to the conveyance carriage 20 detected by the curve outlet sensor 45.

Specifically, the curve outlet sensor 45 detects the fin 26 of the conveyance carriage 20, and thereby, a detection signal (detection result) is transmitted to the supervisory controller 40. The supervisory controller 40 detects a position of the conveyance carriage 20 based on the detection signal (detection result) transmitted from the curve outlet sensor 45. Further, the supervisory controller 40 identifies the carriage number of the conveyance carriage 20 by collating the detected position of the conveyance carriage 20 with the position of the conveyance carriage 20 assumed in reference to the conveyance carriage 20 detected by the carriage detection sensor 43. The supervisory controller 40 updates positional information concerning the conveyance carriage 20 having the carriage number identified to the position of the conveyance carriage 20 assumed in reference to the conveyance carriage 20 detected by the curve outlet sensor 45 from the position of the conveyance carriage 20 assumed in reference to the conveyance carriage 20 detected by the carriage detection sensor 43.

Next, timing when the ground side optical transmission device 41 transmits an instruction signal to start the operation of the belt conveyor 23 to the carriage side optical transmission device 39 of the conveyance carriage 20 will be described.

As described above, the ground side optical transmission device 41 transmits the instruction signal from the supervisory controller 40 to the carriage side optical transmission device 39 of the conveyance carriage 20. The supervisory controller 40 causes the instruction signal to be transmitted from the ground side optical transmission device 41 based on the positional information of the conveyance carriage 20 assumed in reference to the conveyance carriage 20 detected by the curve outlet sensor 45.

Specifically, the supervisory controller 40 calculates timing at which the conveyance carriage 20 reaches the position where the ground side optical transmission device 41 is disposed, based on the positional information of the conveyance carriage 20 assumed in reference to the conveyance carriage 20 detected by the curve outlet sensor 45. The supervisory controller 40 instructs the ground side optical transmission device 41 to transmit the instruction signal to the carriage side optical transmission device 39 at the calculated timing. At this time, a deviation may occur between the position of the conveyance carriage 20 assumed by the supervisory controller 40 in reference to the conveyance carriage 20 detected by the curve outlet sensor 45, and the position of the conveyance carriage 20 actually traveling on the conveyance path K, due to variation of the traveling speed of the conveyance carriage 20 traveling on the conveyance path K or the like. In this case, the supervisory controller 40 causes the ground side optical transmission device 41 to transmit the instruction signal based on the position of the conveyance carriage 20 assumed in reference to the conveyance carriage 20 detected by the curve outlet sensor 45, and therefore the carriage side optical transmission device 39 receives the instruction signal at a position deviated from a position where the instruction signal should be originally received. Therefore, the belt conveyor 23 cannot start a sorting operation of the article 90 at original timing, and cannot deliver the article 90 to the chute 13 in an appropriate trajectory. In some cases, the article 90 may fall from the chute 13.

Consequently, the supervisory controller 40 identifies the conveyance carriage 20 that should deliver the article 90 to the chute 13, and controls the ground side optical transmission device 41 so that the ground side optical transmission device 41 transmits the instruction signal to the carriage side optical transmission device 39 provided in the conveyance carriage 20 identified by the supervisory controller 40 at timing when the identified conveyance carriage 20 is detected by the trigger sensor 44.

The trigger sensor 44 detects the conveyance carriage 20 in a constant position of the conveyance path K regardless of presence or absence of the deviation between the position of the conveyance carriage 20 assumed in reference to the conveyance carriage 20 detected by the curve outlet sensor 45, and the position of the conveyance carriage 20 actually traveling on the conveyance path K. Accordingly, the carriage side optical transmission device 39 can receive the instruction signal from the ground side optical transmission device 41 in the constant position of the conveyance path K, and can start the sorting operation of the belt conveyor 23 at timing when the article 90 can be properly delivered to the chute 13 from the belt conveyor 23, by matching the timing when the ground side optical transmission device 41 transmits the instruction signal to the carriage side optical transmission device 39 to the timing when the trigger sensor 44 detects the conveyance carriage 20.

At a time point when the supervisory controller 40 identifies the conveyance carriage 20 that should deliver the article 90 to the chute 13, the supervisory controller 40 selects the ground side optical transmission device 41 corresponding to the chute 13, and selects the trigger sensor 44 corresponding to the selected ground side optical transmission device 41. When the article 90 is delivered to the chute 13 at the most downstream side out of the three chutes 13, for example, the supervisory controller 40 selects the ground side optical transmission device 41 at the most downstream side corresponding to the chute 13 at the most downstream side, and selects the trigger sensor 44 at the most downstream side corresponding to the selected ground side optical transmission device 41. The supervisory controller 40 controls the ground side optical transmission device 41 at the most downstream side so that the ground side optical transmission device 41 at the most downstream side transmits the instruction signal to the carriage side optical transmission device 39 provided in the conveyance carriage 20 at timing when the conveyance carriage 20 is detected by the trigger sensor 44 at the most downstream side.

As above, according to the present embodiment, according to the sorting facility 10 of the present invention, start of delivery of the article 90 is instructed to the belt conveyor 23 at the timing when the trigger sensor detects the conveyance carriage 20 identified by the supervisory controller 40 based on the managed position of the conveyance carriage 20, and therefore, even when a deviation occurs between the position of the conveyance carriage 20 managed by the supervisory controller 40, and the position of the conveyance carriage 20 actually traveling on the conveyance path K, it is possible to make an instruction to the belt conveyor 23 at the same timing in the predetermined position. Accordingly, the belt conveyor 23 can reliably deliver the article 90 in the chute 13 regardless of presence or absence of the deviation of the position of the conveyance carriage 20 managed by the supervisory controller 40.

In the present embodiment, the carriage detection sensor 43 and the bar code reader 42 are provided in the positions at the conveyance upstream side from the position where the article 90 is inputted to the conveyance carriage 20, and the trigger sensor 44 is provided in the position at the conveyance upstream side from the position where the article 90 is delivered from the conveyance carriage 20. However, the present invention is not limited to this, and the carriage detection sensor 43 and the bar code reader 42 may be provided in positions at the conveyance upstream side from the position where the article 90 is delivered from the conveyance carriage 20, and the trigger sensor 44 may be provided in a position at the conveyance upstream side from the position where the article 90 is inputted to the conveyance carriage 20. In other words, the sorting position of the present invention is not limited to the position (position where the chute 13 is disposed) where the article 90 is delivered from the conveyance carriage 20, and may be the position (position where the induction conveyor 12 is disposed) where the article 90 is inputted to the conveyance carriage 20.

In the present embodiment, the supervisory controller 40 functions as the position management section managing the position of the conveyance carriage 20 on the conveyance path K. However, the present invention is not limited to this, and another controller (controller provided in the main conveyor device 11, for example) independently of the supervisory controller 40 may manage the position of the conveyance carriage 20.

In the present embodiment, the article 90 is sorted to the chute 13 by the belt conveyor 23 provided on the conveyance carriage 20. However, the present invention is not limited to this, and, for example, a tilt tray type sorter sorting the article 90 by swinging in a direction horizontally orthogonal to the conveyance direction of the conveyance carriage 20 may be adopted, as long as it can sort the article 90 conveyed by the conveyance carriage 20 to the chute 13.

In the present embodiment, the supervisory controller 40 corrects a positional deviation of the conveyance carriage 20 by assuming the position on the conveyance path K in reference to the conveyance carriage 20 detected by the curve outlet sensor 45, and manages the corrected position of the conveyance carriage 20. However, the present invention is not limited to this, and the supervisory controller 40 may manage only the position of the conveyance carriage 20 assumed in reference to the conveyance carriage 20 detected by the carriage detection sensor 43 without the curve outlet sensor 45 being provided.

In the present embodiment, the curve outlet sensor 45 is provided at the outlet portion 11b of the curve portion 11a of the main conveyor device 11. However, the curve outlet sensor 45 is not limited to this, and may be provided in any place where a deviation easily occurs between the position of the conveyance carriage 20 assumed by the supervisory controller 40 in reference to the conveyance carriage 20 detected by the carriage detection sensor 43, and the position of the conveyance carriage 20 actually traveling on the conveyance path K.

In the present embodiment, the curve outlet sensor 45 is composed of a single-optical axis sensor, but is not limited to this, and may be composed of a multi-optical axis sensor, or may be composed of a combination of a multi-optical axis sensor and a bar code reader, as long as it can detect the conveyance carriage 20.

REFERENCE SIGNS LIST

10 Sorting facility
13 Chute (sorting position)
20 Conveyance carriage
23 Belt conveyor (sorting section)
40 Supervisory controller (control section, position management section)
42 Bar code reader (position management section)
43 Carriage detection sensor (position management section)
44 Trigger sensor (first carriage detection section)
90 Article (object to be conveyed)
K Conveyance path

What is claimed is:

1. A sorting facility connecting a plurality of conveyance carriages conveying objects to be conveyed along a conveyance path, and sorting the objects to be conveyed by loading the objects to be conveyed to the conveyance carriages or delivering the objects to be conveyed from the conveyance carriages, in a sorting position formed in a predetermined position of the conveyance path, comprising:
   a position management section managing a position of each of the conveyance carriages on the conveyance path;
   a first carriage detection section provided at a conveyance upstream side of the conveyance path from the sorting position, in a position different from a position where the position management section is provided;
   a second carriage detection section provided to detect each of the conveyance carriages on the conveyance path, in a position different from the position where the position management section is provided;
   a sorting section provided on each of the conveyance carriages and sorting each of the objects to be conveyed that is conveyed by each of the conveyance carriages; and
   a control section controlling the position management section, the first carriage detection section, and the sorting section, the control section being configured to:
      detect a position of each of the conveyance carriages based on a detection result of the second carriage detection section; and
      identify each of the conveyance carriages detected by the second carriage detection section from the detected position of each of the conveyance carriages, and the position of each of the conveyance carriages managed by the position management system;
      identify each of the conveyance carriages that should sort each of the objects to be conveyed in the sorting position, based on the position of each of the conveyance carriages managed by the position management section;

instruct the sorting section provided on each of the conveyance carriages identified to sort each of the objects to be conveyed; and instruct the sorting section provided on each of the conveyance carriages identified to start a sorting operation of each of the objects to be conveyed at timing when the first carriage detection section detects each of the conveyance carriages identified.

2. The sorting facility according to claim 1, comprising:

a transmission section provided at a conveyance upstream side of the conveyance path from the sorting position to transmit an instruction from the control section to the sorting section, wherein the transmission section transmits an instruction to start the sorting operation of each of the objects to be conveyed to the sorting section provided on each of the conveyance carriages identified by the control section at the timing when the first carriage detection section detects each of the conveyance carriages detected by the control section.

3. The sorting facility according to claim 1, wherein the first carriage detection section is provided at a conveyance upstream side from a position where the sorting section delivers each of the objects to be conveyed from each of the conveyance carriages, in the conveyance path.

4. The sorting facility according to claim 2, wherein the first carriage detection section is provided at a conveyance upstream side from a position where the sorting section delivers each of the objects to be conveyed from each of the conveyance carriages, in the conveyance path.

\* \* \* \* \*